United States Patent [19]

Haiges

[11] Patent Number: 4,561,633
[45] Date of Patent: Dec. 31, 1985

[54] VALVE FOR ANIMAL WATERING TANKS

[75] Inventor: Adolf Haiges, Bönnigheim/Würh., Fed. Rep. of Germany

[73] Assignee: Suevia Haiges GmbH & Co., Fed. Rep. of Germany

[21] Appl. No.: 509,584

[22] Filed: Jun. 30, 1983

[30] Foreign Application Priority Data

Jun. 30, 1982 [DE] Fed. Rep. of Germany ... 8218670[U]

[51] Int. Cl.⁴ ............................................. F16K 31/00
[52] U.S. Cl. ................................... 251/339; 251/89.5; 251/95; 251/354; 137/616; 119/75
[58] Field of Search ................. 119/72.5, 75; 251/354, 251/349, 89.5, 95, 339; 137/616

[56] References Cited

U.S. PATENT DOCUMENTS

| | | | |
|---|---|---|---|
| 3,396,743 | 8/1968 | Mackal et al. | 251/354 |
| 3,868,926 | 3/1975 | Olde | 119/75 |
| 4,246,870 | 1/1981 | Gustin | 119/75 |
| 4,370,948 | 2/1983 | Atkins | 119/75 |

FOREIGN PATENT DOCUMENTS 1506940 11/1967 France ................................ 119/75

Primary Examiner—A. Michael Chambers
Attorney, Agent, or Firm—Wigman & Cohen

[57] ABSTRACT

In order to make possible, with a valve having a sleeve (110) provided with a valve seat (112) and with a valve activating tube (118) which supports a spring-biased valve body (114) which can be tipped away from the valve seat (112), a high water flow rate even under low water pressure, it is proposed, instead of a support of the valve body (114) on the valve seat (112) during valve opening, which inhibits water flow and causes wear, as is the case with a valve which closes with water pressure, to provide the sleeve (110) in a valve which closes against the water pressure with an axial, annular shoulder (133), the diameter of which is larger than the diameter of the valve seat (112) and on which the frontal surface (162) of the tube (118) nearest the annular shoulder (133) is supported.

17 Claims, 3 Drawing Figures

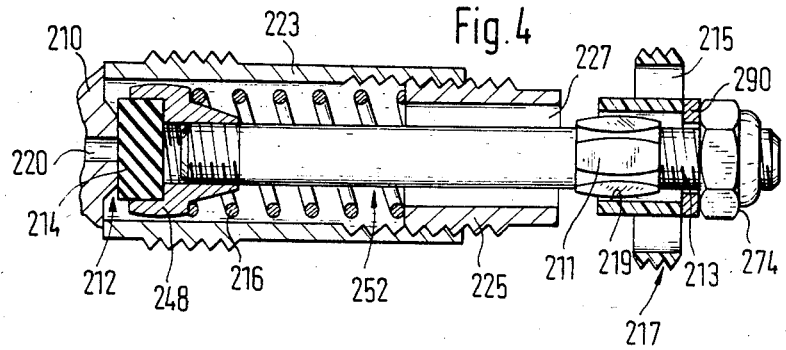
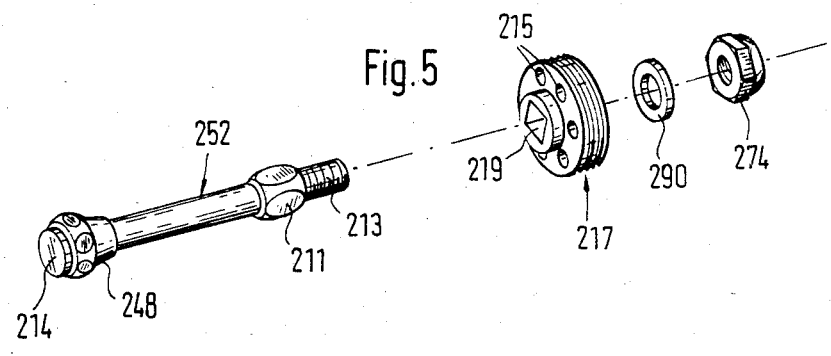
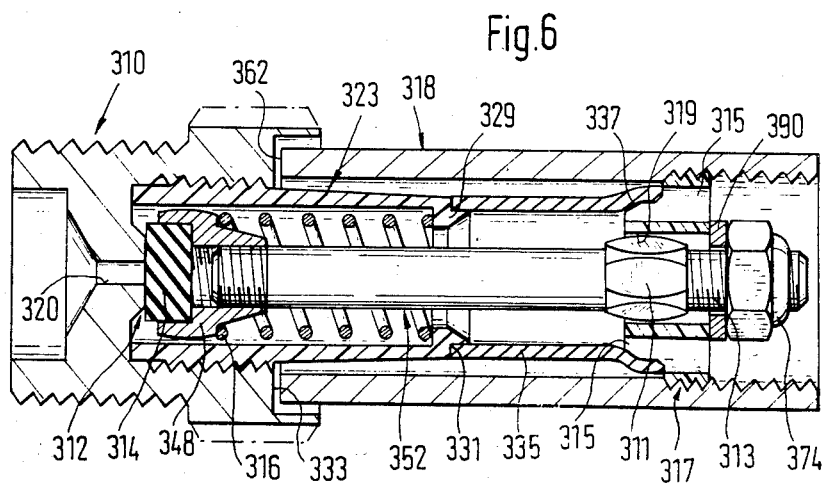

VALVE FOR ANIMAL WATERING TANKS

BACKGROUND OF THE INVENTION

1. Field of the Invention

The invention relates to a valve for animal watering tanks, having a colinear arrangement of a water supply sleeve which can be connected to the tank, which sleeve is provided with an annular valve seat; and a valve activating tube for the water supply, which tube supports a spring-biased valve body, which lifts away from the valve seat as a result of lateral deflection of the end of the tube remote from the sleeve by tipping.

2. Description of the Prior Art

In a known valve of this type, which is closed by water pressure, the valve seat consists of a flat sealing ring attached to an inner shoulder of the sleeve. The narrow width of the sleeve determines the water flow rate, which is adjusted by the amount of deflection of the valve activating tube. This flow rate is usually insufficient, particularly with low water pressure, when occasionally unusable sleeve diameters are provided. In all cases, the valve body does not lift completely away from the valve seat, because it must be supported on the valve seat, so that water flow past the support point is not possible. The relative motion of the valve elements, which are subject to friction, leads to unnecessary wear.

SUMMARY AND OBJECTS OF THE INVENTION

The object of the invention, therefore, is to create a valve for animal watering tanks which valve avoids these prior art disadvantages and which makes possible a high water flow rate even under low pressure.

This object is achieved according to the invention with a valve of the above-described type, in that in a valve which closes against the water pressure, an example of which is found in West German Patent No. 1,550,317, the sleeve is provided with an axial, annular shaped shoulder, the diameters of which are larger than the diameter of the valve seat and on which the frontal surface of the tube nearest the shoulder can be supported. In this manner, it is advantageously achieved that, with a certain narrow width of the valve seat and with a certain deflection of the valve activating tube as a result of the radially outwardly mounted support, now no longer of the valve body on the valve seat but of the tube on the sleeve, a wider valve opening is provided than previously, so that a greater quantity of water per unit of time can flow through the valve. In addition, by this means, the valve body lifts away from the valve seat without friction, so that wear is eliminated.

In a first exemplary embodiment of the valve according to the invention, the exterior collar of the sleeve is axially arranged on the valve body side of the valve seat, so that the valve body comes completely out of contact with the valve seat when the valve is opened and does not rub on the valve seat at a point near the support point, which would otherwise cause wear on the generally rubber valve body.

In the first exemplary embodiment, the valve activating tube of which, as in the known valve of the above-described type, contains a coaxial axle which supports the valve body, the tube is mounted on the axle so as to be axially movable to adjust the amount of play between the collar and the frontal surface of the tube. The amount of play has an influence on the valve opening process and therefore allows the water flow rate to be set, even though within narrow limits.

In the first exemplary embodiment, the valve body of which has a smooth, circular contact surface and the valve seat of which has an annular sealing surface, as is the case with the known valve of the above-described type, the valve seat is provided with an axial, annular recess adjacent the sealing surface to receive the edge of the contact surface. The recess prevents the edge section of the valve body from impacting against the valve body, which edge section tips back somewhat as the valve is opened.

In the first exemplary embodiment, a compression-biased, pre-tensed helical spring is arranged on the axle between a plug which is passed through by the axle and is screwed to the end of the sleeve near the tube, and a casing which holds the valve body and is connected to the end of the axle near the sleeve. By means of this embodiment, after the extended valve activating tube has been removed, the valve can be easily disassembled, in that the plug is screwed off from the sleeve and the casing is screwed off from the axle, for example.

In a second exemplary embodiment of the valve according to the invention, the tube and its extension are connected with each other by means of an angled transition element, which includes axially parallel bores for flanking water flow. Because of the angling, simple bores are sufficient to connect the interior with the exterior of the tube in the direction of water flow.

In the second exemplary embodiment, the tube is mounted on the axle so as not to rotate and the axle is provided with a threading, onto which an adjusting nut is screwed which acts on the tube. As a result, in order to adjust the amount of play between the collar and the adjacent frontal surface of the tube, the axle does not need to be gripped in a rotation preventing manner, for example at its end which projects out of the adjusting nut, before the nut can be adjusted. Instead, it is sufficient to simply hold the easily accessible tube while the adjusting nut is turned.

In the second exemplary embodiment, the sleeve is provided with a cap screw, on which an outer shoulder is formed, and the cap screw locks in place a spring housing which is axially flanged to the sleeve and holds a helical shaped valve spring. In this embodiment, the valve spring and the valve body can be especially easily exchanged, without thereby inhibiting the manner of operation of the valve.

In the second exemplary embodiment, the tube is provided with a screwed-on support, which can be moved between an effective position, in which it engages axially in a stationary annular rim, and an ineffective position, in which it is axially withdrawn from the annular rim. By this means, it is possible to prevent the animal from activating the valve, in that the valve activating tube is extended to such an extent by rotating the support that it projects into the annular rim by means of the support, which can be, for example, a depression in the floor of a watering tank.

In the second exemplary embodiment, it is provided that the support consists of plastic material and is provided on its end near the valve with a radially inward annular rib, which engages in respective radial outward grooves of the tube in a radially relaxed manner in both the effective and ineffective support positions. The axial but not radial form-fitting connection of the support with the tube carrying it detents the support in its two extreme positions, so that unintended intermediate positions, which the animal could otherwise intentionally or unintentionally cause, are not possible.

In third and fourth exemplary embodiments of the valve according to the invention, it is provided that the sleeve includes an inner shoulder and radially surrounds the end of the tube supported thereon. This results, in comparison to the two other exemplary embodiments, in a more slender shape and a simultaneously decreased water flow rate, which is nevertheless sufficient, because the third exemplary embodiment is intended therefor and is suited, with its tube, to be taken by the animal into its mouth.

In the third and fourth exemplary embodiments, a disc, having openings parallel to the axis and a central axial opening which deviates from the perfectly cylindrical shape, is screwed into the end of the tube remote from the sleeve. The axle engages in the central axial opening in a non-rotating manner, whereby the adjusting nut acts against the disc. The threaded-in disc with its resulting non-rotational connection of the tube with the axle has the advantage that the end of the tube remote from the sleeve does not require a cast hub for the mounting of the axle, so that bite-resistant metal can be used for the tube instead of plastic, from which a hub formed in one piece with the tube could only be made with great expense in materials and labor.

The third and fourth exemplary embodiments include a spring housing which is screwed into the sleeve and which holds a helical valve spring. The spring housing can enter as far as desired into the end of the tube nearest the sleeve.

In the fourth exemplary embodiment, the water flow admitting spring housing and the edge of the disc are connected with each other in a water conductive manner by means of a flexible tubing element surrounding the axle. The flexible tubing element prevents air from being aspirated from outside into the tube between the inner shoulder of the sleeve and the frontal surface of the tube supporting it. Otherwise, the water flowing out of the tube would be able to foam.

In the third exemplary embodiment, the end of the valve housing remote from the sleeve is provided with an adjusting screw which contains openings and is screwed on so as to be axially adjustable. The valve spring is supported on this adjusting screw. The closing force of the valve can be easily adjusted by means of the adjusting screw and can thereby be adapted to the prevailing water pressure.

In the third and fourth exemplary embodiments, the adjusting nut is arranged inside the tube, so that the animal does not rotate the adjusting nut with its tongue by taking the tube into its mouth.

BRIEF DESCRIPTION OF THE DRAWINGS

In the following sections, the invention is described in greater detail with the aid of the four exemplary embodiments of the valve made according to the invention shown as examples in the drawings.

FIG. 4 is an axial longitudinal section through the horizontally arranged third exemplary embodiment, of which several elements have been left out;

FIG. 5 is an exploded perspective view of a portion of the third exemplary embodiment; and FIG. 6 is a complete illustration of the fourth exemplary embodiment corresponding to FIG. 4.

DETAILED DESCRIPTION OF THE PREFERRED EMBODIMENTS

Figure 1:
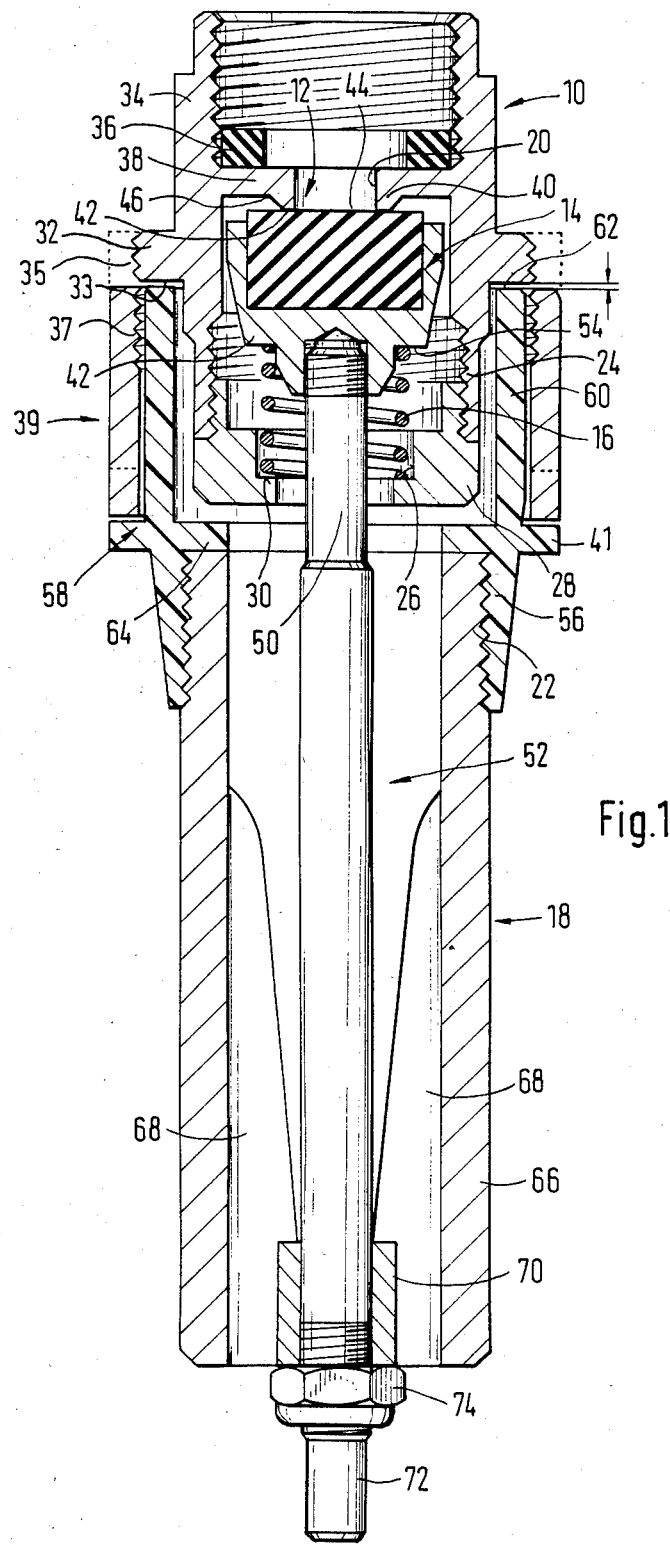
FIG. 1 is an axial longitudinal section through the vertically arranged first exemplary embodiment.

The first exemplary embodiment of the valve according to the invention consists according to FIG. 1 primarily of a cylindrical sleeve 10 with a valve seat 12, a valve body 14 which cooperates with the valve seat 12 and is acted upon by a helical spring 16, and a cylindrical, smooth tube 18 to activate the valve. The sleeve 10, a bore 20 in the valve seat 12, the disc-shaped valve body 14, the helical spring 16, and the tube 18 are arranged coaxially, i.e., colinearly.

At its lower end 24 adjacent an upper end 22 of the tube 18, the sleeve 10 includes an internal threading, into which a plug 28 provided with a stepped central bore 26 is screwed, against an inner shoulder 30 of which the lower end of the spring 16 is supported. Beneath the valve seat 12 the sleeve 10 is provided with an exterior collar 32, which includes on its underside a shoulder 33 and at its periphery a threading 35, on which the interior threading 37 of an axially movable ring 39 can be screwed. In its ineffective position, this ring 39 rests on an outer collar 41.

An upper end 34 of the sleeve 10 is also provided with an internal threading to permit the screwing in of the end of a water line, which presses a sealing ring 36 against the upper side of the valve seat 12.

The valve seat 12 is formed on an internal collar 38, which, together with an annular, outwardly conical projection 40, form the downward wall of the bore 20. On its underside the projection 40 includes a smooth sealing surface 42, which cooperates with a smooth, circular contact surface 44 on the upper side of the valve body 14, and is provided with an annular recess 46 formed by the valve body 14 itself and by the internal collar 38.

The valve body 14 is made of rubber and is press fit into a casing 48, which is arranged beneath the valve seat 12 in the sleeve 10. The casing 48, the outside of which is formed as a cylindrical hexagon, is screwed at its underside onto an upper end 50 of an axle 52 which is coaxial with respect to the tube 18 and projects out from the top of the tube 18. The casing 48 includes an outer shoulder 54 which forms the abutment for the upper end of the helical spring 16, which surrounds the upper end 50 of the axle 52, which extends through the bore 26 in the plug 28. The valve body 14 projects up out of the casing 48 and its extended edge, which radially surrounds the sealing surface 42 of the valve seat 12, can engage in the annular recess 46, when it is tipped.

The compression-biased helical spring 16 is pretensed in the closed condition of the valve in accordance with the water pressure.

The valve activating tube 18 is provided at its upper end 22 with an external threading, on which the internal threading of a lower section 56 of a sleeve-like extension 58 of the tube 18 is screwed, an upper portion 60 includes an upper frontal surface 62, which stands opposite the lower shoulder 33 of the exterior collar 32 of the sleeve 10 with a slight amount of play. The adjacent outer edges of the interior collar 32 and the frontal surface 62 are each provided with a contact phase. The upper portion 60 of the tube extension 58 is surrounded by the ring 39 with a slight amount of play, said ring 39 extending axially to a point near the frontal surface 62.

An inner collar 64 of the extension 58 which separates the two sections of the extension 58, from which inner collar 64 the axle 52 extends, forms a stop as the tube 18 is screwed into its extension 58. The outer and inner collars 41 and 64 are located axially at the same point. A lower end 66 of the tube 18 is provided with a bushing 70 which is mounted by means of lamina 68, which bushing 70 surrounds a lower end 72 of the axle 52 which projects out of the lower end 66 of the tube 18. The lower end 72 of the axle 52 includes a threaded section, to which is screwed an adjusting nut 74 which supports the bushing 70. The axial position of this adjusting nut 74 determines the amount of play between the outer shoulder 33 of the sleeve 10 and the frontal surface 62 of the tube extension 58.

The manner of operation of the described first exemplary embodiment is as follows:

Beginning with the illustrated closed condition of the valve, said valve is opened as soon as the animal to be watered takes the valve activating tube 18 in its mouth or its snout and strikes against this tube 18, so that the tube 18 is laterally deflected. As this deflection occurs, the frontal surface 62 of the tube extension 58 is supported on a point of the lower shoulder 33 of the sleeve 10 that depends on the direction of the deflection. At the diametrically opposite point of the exterior collar 32, the frontal surface 62 is the farthest removed from the collar 32. As a result, during its pivot movement, the valve body 14 lifts away from the valve seat 12 without friction against the return force of the spring 16, so that the water can flow in through the upper end 34 of the sleeve 10, past the valve seat 12, past the cornered casing 48 with its valve body 14, which casing 48 sits in place in the round sleeve 10 with a great deal of play, through the lower end 24 of the sleeve 10, past the helical spring 16, through the plug bore 26 and the tube 18 downward into the animal watering tank, which is located beneath the valve.

If valve activation is desired to be prevented, the ring 39 is pushed upward on the extension section 60 and is screwed onto the sleeve collar 32 in the position shown in phantom lines. This removes the mobility of the tube 18 with its extension 58 until the ring 39 is screwed back off.

Figure 2:
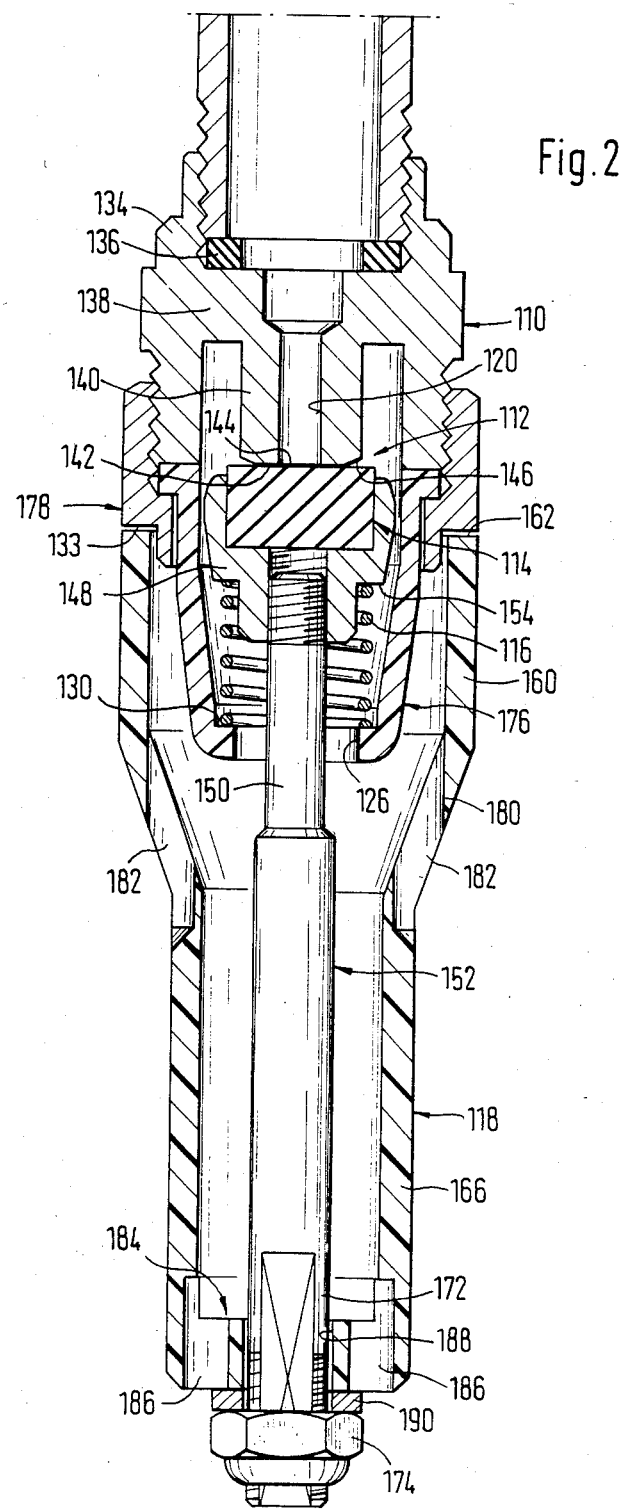
FIG. 2 is a corresponding illustration of the second exemplary embodiment.
Figure 3:
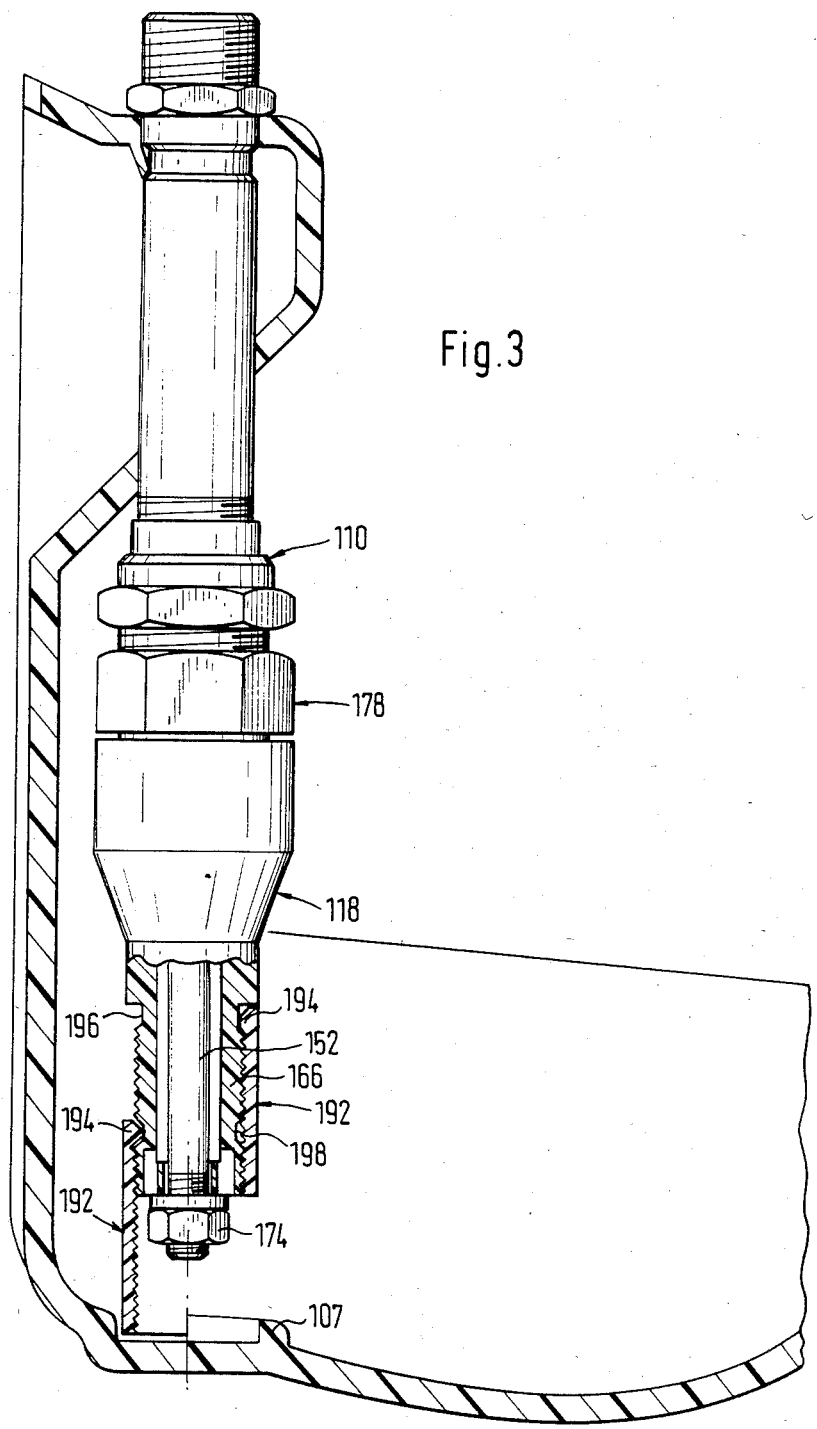
FIG. 3 is a broken side view of the second exemplary embodiment illustrated partially in two conditions.

The second exemplary embodiment of the valve according to the invention is generally similar to the first exemplary embodiment and is shown in FIGS. 2 and 3. To the extent that nothing to the contrary is described below, the description of the first exemplary embodiment basically applies to that of the second exemplary embodiment as well, the elements of which, if they are the same or correspond to elements of the first exemplary embodiment, are designated with reference numerals increased by 100.

In place of the plug 28, a spring housing 176 is provided which is axially flanged to the sleeve 110 and is held by a sleeve nut 178 screwed onto the sleeve 110. This sleeve nut 178 includes a lower shoulder 133 which supports the valve activating tube 118 and replaces the outer collar 32. The tube 118 is formed of plastic material and is made in one piece with its extension 58. In place of the screw connection of the upper end of the tube 22 with the lower extension section 56, the tube 118 includes an angled transition element 180 which connects an upper tube section 160, which includes an upper frontal surface 162, with a more slender lower tube end 166 and is provided with several bores 182 which are parallel to the axis and are uniformly distributed about the circumference of the tube 118, through which the water flowing out of the bore 126 of the spring housing 176 can pass from the inside of the tube 118 into the open. This water flows primarily through the lower tube end 166, which is provided with a closing hub 184, which, in turn, also includes several bores 186 parallel to the axis and uniformly distributed about the circumference of the tube 118. The hub 184 includes a central opening 188 with a non-round cross section, which holds a lower end 172 of an axle 152, which is provided with a corresponding cross section, so as to prevent relative rotation thereof. The adjusting nut 174 is screwed onto the lower end 172 of the axle 152 and acts on the hub 184 from the outside by means of a retaining washer 190.

The manner of operation of the described second exemplary embodiment is the same as that of the first exemplary embodiment with the exception that water also flows out of the bores 182, as described above.

In order to be able to make the second exemplary embodiment inoperable, its valve activating tube 118 is provided, as shown in FIG. 3, with a plastic, threaded support 192, the upper end of which nearest the valve includes a radially inward annular rib 194, which can snap selectively into two radially outward grooves 196 and 198 which are provided in the lower tube end 166 and are axially displaced relative to each other. In its effective position, shown on the left half of FIG. 3, the lower free end of the support 192 engages in a floor depression in an animal watering tank provided with the second exemplary embodiment, whereby the edge of the depression is a stationary annular rim 107 for the radially movable support 192.

As can be seen in FIG. 3, the second exemplary embodiment (like the first) is hung vertically at the back wall of the animal watering tank. In contrast, the third and fourth exemplary embodiments of the valve according to the invention are intended for horizontal arrangement.

The third and fourth exemplary embodiments of the valve according to the invention as shown in FIGS. 4, 5 and 6 consist primarily of a cylindrical sleeve 210 or 310 with a valve seat 212 or 312, a valve body 214 or 314 which cooperates therewith and is acted upon by a helical spring 216 or 316, and of a cylindrical, smooth tube 318 to activate the valve. The sleeve, a bore 220 or 320 of the valve seat, the circular disc-shaped valve body 214 or 314, the helical spring 216 or 316, and the tube 318 are arranged coaxially, i.e., colinearly. This is also true for an axle 252 or 352 which passes centrally through the tube 318. In the drawing, the left rear end of this axle 252 or 352 is screwed into a casing 248 or 348 which supports the valve body and also holds the helical spring which is supported on the casing. The right front end of this axle 252 or 352 as shown in the drawing includes a four-sided section 211 or 311 and a final threaded section 213 or 313. A circular disc 217 or 317 provided with several bores 215 or 315 uniformly distributed about the circumference of the tube 318 and having a central, four-sided opening 219 or 319 is arranged on the four-sided section 211 or 311 of the axle 252 or 352. The periphery of this disc 217 or 317 is screwed into the right front end of the tube 318, as shown in FIG. 6 of the drawings, and allows water to pass through its bores 315. An adjusting nut 274 or 374 is screwed onto the threaded section 213 or 313 of the axle 252 or 352 and acts from the outside on the disc 217 or 317, which is fixed in place axially in the tube 318, by means of a retaining washer 290 or 390. The left rear frontal surface 362, as shown in FIG. 6 of the drawings, lies opposite an annular inner shoulder 333 of the sleeve 310 with an amount of play therebetween, which inner shoulder 333 is directed toward the right, as shown in FIG. 6 of the drawings, and is faced by the frontal surface 362 of the tube 318.

In the third exemplary embodiment according to FIGS. 4 and 5, a tubular spring housing 223 is coaxially screwed into the sleeve 210. The half of this spring housing 223 which projects out of the sleeve 210 extends into the valve activating tube (not shown) and a screwed-in adjusting screw 225 is provided at its front end, on which the end of the helical spring 216 opposite the casing 248 is supported. A sufficiently large annular space 227 exists between the adjusting screw 225 and the axle 252 to assure water passage. The closing force of the valve can be changed by an axial movement of the adjusting screw 225.

In the fourth exemplary embodiment according to FIG. 6, a tubular spring housing 323 is also screwed into the sleeve 310, but here the spring housing 323 includes a stationary inner flange 329 at its front end, on which the helical spring 316 is supported and which is provided on its outer side with an annular right-angled recess 331. This annular right-angled recess 331 receives the rear end of a piece of flexible tubing 335, the front end of which sits on an axial projection 337 formed axially inward on the disc 317. The bores 315 go through this axial projection 337, so that when the valve is opened, water which enters into the spring housing 323 and leaves through its inner flange 329, is guided by the flexible tubing 335 through the disc bores 315, past the front end of the tube 318 and into the open atmosphere at the right of FIG. 6. This front end of the tube 318 is supported by the threaded section 313 of the axle 352 and the adjusting nut 374.

The manner of operation of the third and fourth exemplary embodiments corresponds essentially with that of the first and second exemplary embodiments; however, one difference thereto exists to the extent that the support point contacted by the frontal surface 362 of the tube 318 and the inner sleeve shoulder 333 when the tube 318 is deflected, has a smaller radial axle spacing and still lies within the sleeve 310.

In all four exemplary embodiments, the valve can be shut off by means of a loosening of the adjusting nut (74, 174, 274, 374) or an adjustment can be made whereby the valve provides a certain flow rate or only drips to release water to attract the animals.

These embodiments of the present invention are considered to be illustrative only since other modifications will be readily discerned by those persons skilled in the pertinent art. In any event, the scope of the invention is intended to be covered by both the letter and the spirit of the claims appended hereto.

I claim:

1. A valve for an animal activated watering tank or the like, comprising:
    a colinear arrangement of a water supply sleeve attached to the tank, said sleeve being provided with an annular valve seat; and
    a water supply valve-activating tube, which supports a spring-biased valve body which opens by tipping away from the valve seat as a result of a lateral deflection of an end of the tube remote from the sleeve;
    wherein in the valve, which closes against water pressure, the sleeve is provided with an axial, annular shoulder, the diameter of which is larger than the diameter of the valve seat and against which a frontal surface of the tube nearest the annular shoulder is abutting when the tube is tilted by said lateral deflection of the said tube end;
    wherein the sleeve is provided with an exterior collar which forms said annular shoulder and the tube is provided with an extension which is coaxial to said sleeve, said extension radially surrounds said sleeve, and the frontal surface of the tube nearest the exterior collar is abutting against the collar shoulder when the tube with its extension is tilted by said lateral deflection of said tube end;
    said tube concentrically surrounding the sleeve with an axially extending concentric gap between the extension and sleeve that permits tilting of the extension; and
    ring means mounted on the tube and being threadably engageable with the sleeve for locking the tube with respect to the sleeve.

2. Valve according to claim 1, wherein the exterior collar of the sleeve is arranged axially on the side of the valve seat on which side the valve body is arranged.

3. A valve for an animal activated watering tank or the like, comprising:
    a colinear arrangement of a water supply sleeve attached to the tank, said sleeve being provided with an annular valve seat; and
    a water supply valve-activating tube, which supports a biased valve body which opens by tipping away from the valve seat as a result of a lateral deflection of an end of the tube remote from the sleeve;
    wherein in the valve, which closes against water pressure, the sleeve is provided with an axial, annular shoulder, the diameter of which is larger than the diameter of the valve seat and against which a frontal surface of the tube nearest the annular shoulder is abutting when the tube is tilted by said later deflection of the said tube end;
    wherein the sleeve is provided with an exterior collar which forms said annular shoulder and the tube is provided with an extension which is coaxial to said sleeve, said extension radially surrounds said sleeve, and the frontal surface of the tube nearest the exterior collar is abutting against the collar shoulder when the tube with its extension is tilted by said lateral deflection of said tube end;
    wherein the valve-activating tube encloses a coaxial axle which supports the valve body, wherein the tube is arranged on the axle so as to be axially movable to adjust the amount of play between the exterior collar and the frontal surface of the tube.

4. Valve according to claim 3, wherein that the sleeve includes an inner shoulder and radially surrounds the frontal surface of the tube.

5. Valve according to claim 3, wherein said sleeve includes a spring housing which contains a helical spring, and a disc which screws into an end of the tube opposite the sleeve.

6. Valve according to claim 5, wherein the spring housing and an edge of the disc are connected with each other in a water-conducting manner by a flexible tubing.

7. Valve according to claim 5, wherein the spring housing is provided on its end remote from the sleeve with an axially adjustable screw, which contains an annular space and a shoulder against which the helical spring is supported.

8. A valve for an animal activated watering tank or the like, comprising:

a colinear arrangement of a water supply sleeve attached to the tank, said sleeve being provided with an annular valve seat; and a water supply valve-activating tube, which supports a spring-biased valve body which opens by tipping away from the valve seat as a result of a lateral deflection of an end of the tube remote from the sleeve;

wherein in the valve, which closes against water pressure, the sleeve is provided with an axial, annular shoulder, the diameter of which is larger than the diameter of the valve seat and against which a frontal surface of the tube nearest the annular shoulder is abutting when the tube is tilted by said lateral deflection of the said tube end;

wherein the sleeve is provided with an exterior collar which forms said annular shoulder and the tube is provided with an extension which is coaxial to said sleeve, said extension radially surrounds said sleeve, and the frontal surface of the tube nearest the exterior collar is abutting against the collar shoulder when the tube with its extension is tilted by said lateral deflection of said tube end;

wherein the valve body includes a contact surface and the valve seat of which includes a sealing surface, wherein the valve seat is provided with an axial, annular recess adjacent the sealing surface to receive an edge of the contact surface.

9. Valve according to claim 3, wherein a compression biased, pre-tensed helical spring is arranged on the axle between a plug passed through by the axle, which plug is screwed to an end of the sleeve near the tube, and a casing which holds the valve body, which casing is connected to an end of the axle near the sleeve.

10. Valve according to claim 3, characterized in that the tube and its upper tube section are connected with each other by an angled transition element, which includes bores aligned parallel to the longitudinal axis of the tube for flanking water flow.

11. Valve according to claim 3, wherein the tube is mounted on the coaxial axle so as not to rotate relative thereto, and the axle is provided with a threading, on which an adjusting nut is screwed, which adjusting nut acts on the tube.

12. Valve according to claim 11, wherein a disc, which includes openings parallel to the longitudinal axis of the tube and has a central axial opening, screwed into an end of the tube opposite the sleeve, in which opening the axle engages without rotation, and in that the adjusting nut engages against the disc.

13. Valve according to claim 11, wherein the adjusting nut is arranged inside the tube.

14. Valve according to claim 3, wherein the sleeve is provided with a sleeve nut, on which a lower shoulder is formed, and in that the sleeve nut locks in place a spring housing which is flanged axially to the sleeve and holds a helical valve spring.

15. A valve for an animal activated watering tank or the like, comprising:

a colinear arrangement of a water supply sleeve attached to the tank, said sleeve being provided with an annular valve seat; and a water supply valve-activating tube, which supports a spring-biased valve body which opens by tipping away from the valve seat as a result of a lateral deflection of an end of the tube remote from the sleeve;

wherein in the valve, which closes against water pressure, the sleeve is provided with an axial, annular shoulder, the diameter of which is larger than the diameter of the valve seat and against which a frontal surface of the tube nearest the annular shoulder is abutting when the tube is tilted by said lateral deflection of the said tube end;

wherein the sleeve is provided with an exterior collar which forms said annular shoulder and the tube is provided with an extension which is coaxial to said sleeve, said extension radially surrounds said sleeve, and the frontal surface of the tube nearest the exterior collar is abutting against the collar shoulder when the tube with its extension is tilted by said lateral deflection of said tube end;

said tube concentrically surrounding the sleeve with an axially extending concentric gap between the extension and sleeve that permits tilting of the extension; and wherein the tube is provided with a threaded support, which can be moved between an effective position, in which it engages axially in a stationary annular rim, and an ineffective position, in which it is axially retracted from the annular rim.

16. Valve according to claim 15, wherein the threaded support is comprised of plastic material and is provided on its end near the valve with a radial, interior annular rib, which in the effective and ineffective support positions engages respectively in one of two radially outward grooves of the tube in a radially relaxed manner.

17. A valve for an animal activated watering tank or the like, comprising:

a water supply sleeve connected to the tank, said sleeve having an annular shoulder;

an annular valve seat located within the sleeve, said seat having a diameter less than the diameter of the shoulder;

means for activating the water supply disposed around the sleeve and having an end located adjacent the annular shoulder of the sleeve;

a valve body disposed within the activating means, said valve body being biased against the valve seat for preventing the flow of water through the valve;

whereby when said activating means is pivoted, the valve body is lifted from the valve seat allowing water to flow through the water supply sleeve;

said end of the activating means being arranged to abut the annular shoulder when the activating means is pivoted to limit the pivoting movement of the activating means; and means mounted on the actuating means and being threadably engageable with the water supply sleeve for locking the activating means with respect to the water supply sleeve.

* * * * *